(12) United States Patent
Takahashi (10) Patent No.: US 7,215,793 B2
(45) Date of Patent: May 8, 2007

(54) ELECTRONIC IMAGE-CAPTURING APPARATUS HAVING FUNCTION FOR VERIFYING USER

(75) Inventor: Akihiko Takahashi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 386 days.

(21) Appl. No.: 10/948,284

(22) Filed: Sep. 24, 2004

(65) Prior Publication Data

US 2005/0036656 A1   Feb. 17, 2005

Related U.S. Application Data

(63) Continuation of application No. 09/544,329, filed on Apr. 6, 2000, now abandoned.

(30) Foreign Application Priority Data

Apr. 7, 1999   (JP)   ................................. 11-100661

(51) Int. Cl.
*G06K 9/00* (2006.01)
(52) U.S. Cl. ...................... 382/100; 382/124
(58) Field of Classification Search ................ 382/100, 382/115, 116, 124, 125, 276; 380/200, 255, 380/287; 283/72, 73, 74, 75, 77, 78; 713/176, 713/179, 186, 189; 348/161, 552, 207.99, 348/231.99, 231.7
See application file for complete search history.

(56) References Cited

U.S. PATENT DOCUMENTS

| 5,841,886 | A  |   | 11/1998 | Rhoads ......................... 382/115 |
| 5,841,978 | A  | * | 11/1998 | Rhoads ......................... 709/217 |
| 5,872,834 | A  |   | 2/1999  | Teitelbaum ................ 379/93.03 |
| 6,038,333 | A  |   | 3/2000  | Wang ............................ 382/118 |
| 6,067,624 | A  |   | 5/2000  | Kuno ............................. 713/202 |
| 6,088,585 | A  |   | 7/2000  | Schmitt et al. .............. 455/411 |
| 6,177,950 | B1 |   | 1/2001  | Robb ......................... 348/14.01 |
| 6,314,196 | B1 |   | 11/2001 | Yamaguchi et al. ......... 382/125 |
| 6,332,193 | B1 | * | 12/2001 | Glass et al. ................... 713/170 |
| 6,400,826 | B1 | * | 6/2002  | Chen et al. ................... 382/100 |
| 6,433,818 | B1 |   | 8/2002  | Steinberg et al. ............ 348/161 |
| 6,556,688 | B1 | * | 4/2003  | Ratnakar ...................... 382/100 |
| 6,563,939 | B1 |   | 5/2003  | Chai ............................. 382/119 |
| 6,748,533 | B1 | * | 6/2004  | Wu et al. ..................... 713/176 |

FOREIGN PATENT DOCUMENTS

WO    WO 97/36426    10/1997

* cited by examiner

*Primary Examiner*—Samir Ahmed
(74) *Attorney, Agent, or Firm*—Oliff & Berridge, PLC (57) ABSTRACT

An electronic image-capturing apparatus includes: an image-capturing element that captures an image of a subject and generates electronic image information; a recording device that records the electronic image information that has been generated in a recording medium; a registration device that registers inherent information with respect to a registrant; an information detection device that detects inherent information with respect to a user of the electronic image-capturing apparatus; an information verification device that references the inherent information with respect to the user detected by the information detection device with the inherent information registered in the registration device; and a control device that allows an image-capturing operation to be performed on the electronic image-capturing apparatus if it is decided by the information verification device that the two sets of inherent information match.

9 Claims, 7 Drawing Sheets

ELECTRONIC IMAGE-CAPTURING APPARATUS HAVING FUNCTION FOR VERIFYING USER

CROSS REFERENCE TO RELATED APPLICATIONS

This is a Continuation of U.S. patent application Ser. No. 09/544,329 filed Apr. 6, 2000 now abandoned. The entire disclosures of the prior application is hereby incorporated by reference herein in its entirety.

INCORPORATION BY REFERENCE

The disclosure of the following priority application is herein incorporated by reference: Japanese Patent Application No. 11-100661 filed Apr. 7, 1999

BACKGROUND OF THE INVENTION

1. Field of the Invention

The present invention relates to an electronic image-capturing apparatus having the user verification function.

2. Description of the Related Art

The increasingly widespread use of digital cameras and the advances in Internet technology have facilitated the handling of digital images so that they can be transferred to another party by electronic mail or the like with ease in recent years. One of the characteristics of digital images is that they can be reproduced or processed without degrading of image quality. In other words, images that another person owns can easily be used without his authorization as if they were owned by oneself. A great deal of concern regarding the issues of copyright and illegal tampering with images has resulted in the development of digital watermarking technology whereby information is invisibly incorporated in the image itself without compromising the quality of the digital image.

A copyright holder employs a special system such as a personal computer to achieve digital watermarking for embedding inherent information that asserts the copyright into the image information of an image obtained by performing a photographic operation on a digital camera in the prior art.

However, when such a system is utilized, digital watermarking information of a party other than the true copyright holder may be input into a photograph. Thus, there is a problem in that a person holding the copyright in the true sense cannot be identified.

SUMMARY OF THE INVENTION

An object of the present invention is to provide an electronic image-capturing apparatus having a user verification function. More specifically, the object of the present invention is to provide an electronic image-capturing apparatus capable of prohibiting the use by a party other than a registered user through user verification and to provide an electronic image-capturing apparatus capable of specifying the true copyright holder through user verification.

In order to attain the above object, an electronic image-capturing apparatus according to the present invention comprises: an image-capturing element that captures an image of a subject and generates electronic image information; a recording device that records the electronic image information that has been generated in a recording medium; a registration device that registers inherent information with respect to a registrant; an information detection device that detects inherent information with respect to a user of the electronic image-capturing apparatus; an information verification device that references the inherent information with respect to the user detected by the information detection device with the inherent information registered in the registration device; and a control device that allows an image-capturing operation to be performed on the electronic image-capturing apparatus if it is decided by the information verification device that the two sets of inherent information match.

In this electronic image-capturing apparatus, it is preferred that a digital watermarking device that adds information related to the inherent information detected by the information detection device to the electronic image information that has been generated as a digital watermark is further provided.

Also, it is preferred that a power control device having a switch to be set at a recording position, a reproduction position or an OFF position, that controls power ON/OFF is further provided, and the control device allows an image-capturing operation to be performed on the electronic image-capturing apparatus without requiring the information verification device to operate as long as the switch remains at the recording position after the information verification device decides that the two sets of inherent information match when the switch is at the recording position.

Also, it is preferred that the registration device enables additional registration of information inherent to another registrant via the information detection device if the information verification device detects an previously registered registrant. In this case, it is preferred that a selection device that selects a limited user mode that limits users of the electronic image-capturing apparatus or an unlimited mode that does not impose any restrictions on users of the electronic image-capturing apparatus is further provided, and the control device implements control to ensure that only the registrant for whom the two sets of inherent information have been verified to match by the information verification device is allowed to operate the selection device.

Also, it is preferred that the inherent information is registrant's fingerprint information and the information detection device is constituted of a sensor that detects fingerprint information. In this case, it is preferred that a grip used by the user to hold the electronic image-capturing apparatus while capturing an image of a subject is further provided, and the sensor is provided at a position at which a finger of the user is naturally placed when the user holds the grip.

Also, it is preferred that a registration control device that deactivates the information verification device if it is decided that information with respect to user detected by the information detection device is not registered at all in the registration device, and registers the inherent information detected by the information detection device in the registration device, is further provided. In this case, it is preferred that the registration control device prohibits updating of contents of information registered in the registration device if it is decided that there is at least one set of inherent information registered in the registration device as long as the information verification device does not decide that two sets of inherent information match.

Also, it is preferred that the control device allows a reproduction operation regardless of results of verification performed by the information verification device when the electronic image information recorded in the recording medium is reproduced.

DESCRIPTION OF THE PREFERRED EMBODIMENT

Figure 1:
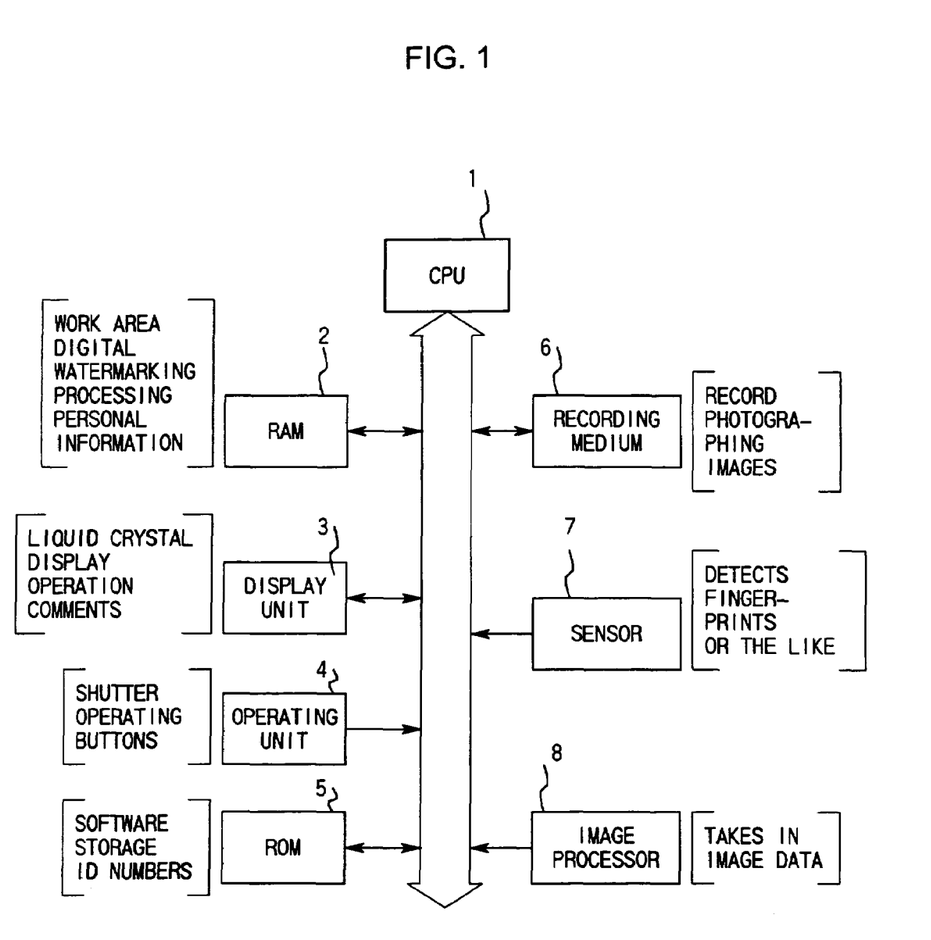
FIG. 1 is a block diagram of a digital camera representing an example of an electronic image-capturing apparatus.
Figure 2:
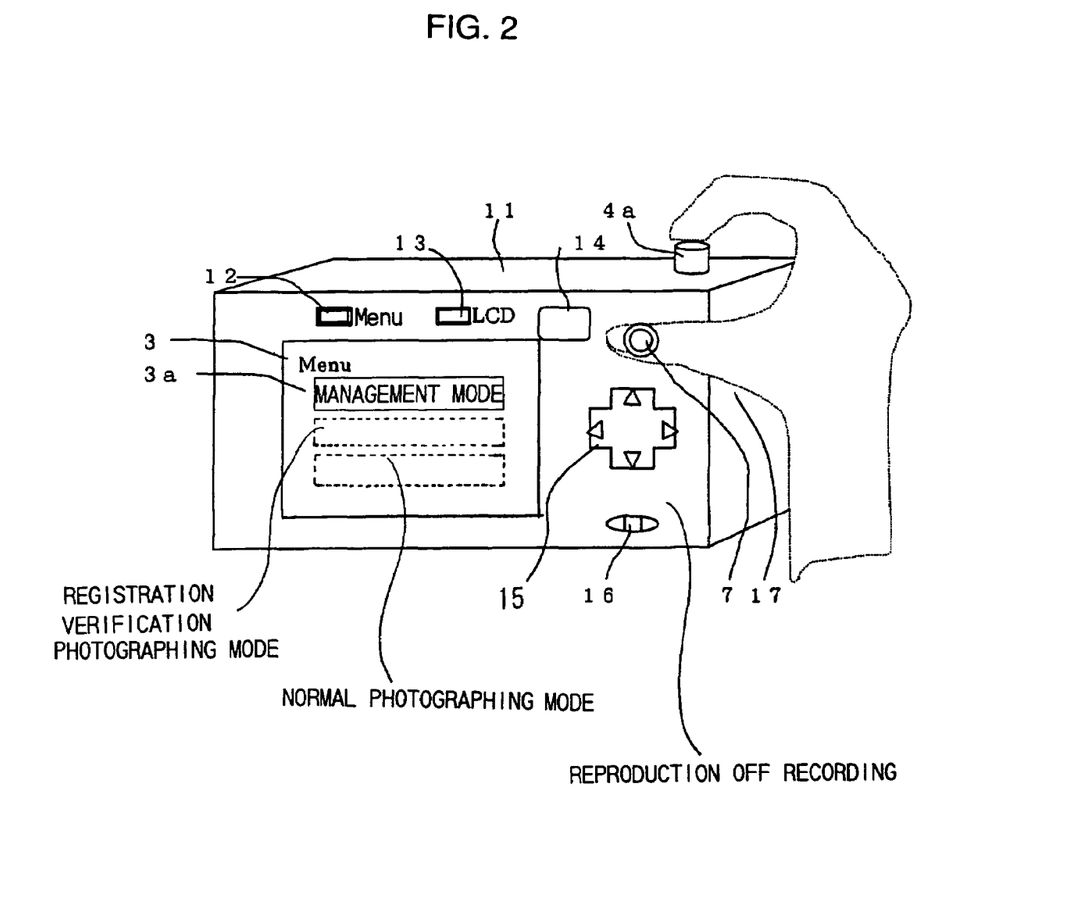
FIG. 2 is an external view of the digital camera in FIG. 1.

FIGS. 1 through 7 illustrate an embodiment of the electronic image-capturing apparatus (electronic photographing apparatus) according to the present invention, with FIG. 1 presenting a block diagram of a digital camera representing an example of the electronic image-capturing apparatus, FIG. 2 presenting an external view of the digital camera in FIG. 1, FIGS. 3~5 and FIG. 7 presenting flowcharts of the operations performed in the digital camera and FIG. 6 presenting examples of display at the digital camera. It is to be noted that the "image-capturing" as referred to in this specification is a concept that includes a photographing operation, and includes all modes in which a subject image is obtained to generate electronic image information (data).

(Structure of Electronic Image-Capturing Apparatus) As illustrated in FIG. 1, the digital camera constituting the electronic image-capturing apparatus is provided with a microcomputer 1 and various control units (RAM 2~image processing circuit 8) connected to the microcomputer 1. The microcomputer 1 executes image-capturing processing, image processing, digital watermarking processing on inherent information and recording processing by controlling the various control units. It is to be noted that the electronic image-capturing apparatus may be constituted of a video camera, a scanner or the like instead of a digital camera. The digital watermarking processing refers to processing implemented to add specific information (such as inherent information) to obtained image data without affecting the image quality, and various methods for implementing this processing have been proposed.

The RAM 2 functions as a work area for the software that controls the digital camera system and as a work area for implementing the digital watermarking processing using inherent information or the like. In addition, the inherent information to undergo the electronic watermarking processing is registered in the RAM 2. Any type of information may be used as the inherent information as long as it enables identification of an individual person, such as fingerprints, voice prints, or iris prints. It is to be noted that the RAM 2 is constituted of a non-volatile memory backed up by a battery, and the data contents in the RAM 2 are not erased even when a power switch 16 is turned off. However, in anticipation of replacement and the like, the contents of the inherent information in the RAM 2 are always backed up in a ROM 5 constituted of an EEPROM whenever the power switch 16 is turned off, and the backed-up inherent information is read out from the ROM 5 to be written into the RAM 2 when the power switch 16 is turned on.

A liquid crystal display unit 3, which is provided with a display drive circuit and an LCD monitor, controls the LCD monitor constituting the external display of the digital camera to display information such as the camera control status and menus.

An operating unit 4 is constituted of operating switches employed to perform various operations to be detailed later, a shutter release switch for implementing photographic exposure and the like.

In the ROM 5, the software that controls the digital camera system is stored and also copyright information (ID information) corresponding to the inherent information to undergo the digital watermarking processing is registered. A plurality of sets of ID information are stored in advance in the ROM 5, with each set of ID information made to univocally correspond to a set of registered inherent information. For instance, the first set of ID information may correspond to a first registered party (person), with a second set of ID information corresponding to a second registered party and so forth.

A recording medium 6, which may be constituted of a CF card, a smart medium, an internal memory or the like, records image signals obtained through photographing.

A sensor 7, which is constituted of a two-dimensional CCD element provided with color filters and a low pass filter, is capable of obtaining fingerprint image data to detect fingerprint information.

The image processing circuit 8 receives image signals from an image-capturing element (not shown) such as a two-dimensional CCD element which is connected to it and performs image processing (interpolation, compression processing and the like) of the known art on the image signals thus received.

FIG. 2 is an external view of the digital camera, illustrating the positions of the liquid crystal display unit 3, the operating unit 4 and the like. The operating unit 4 comprises a shutter release switch 4a, a menu switch 12, a liquid crystal display switch 13, a four-way switch 15 and the power switch 16.

The shutter release switch 4a is provided on the upper cover of the digital camera at the top of a right grip 17. The shutter release switch 4a functions as a photographing start switch in a recording mode (also referred to as a photographing mode), functions as a setting switch operated to set various menu items in a menu mode and also functions as a switch operated to detect a fingerprint and register the fingerprint data, for instance, in an personal information registration mode.

The menu switch 12 is provided at the rear surface of the digital camera above the liquid crystal display unit 3. The menu switch 12 is operated when switching the liquid crystal display unit 3 to the screen for menu item selection to change the digital camera function. For instance, the menu items include a management mode, a registration verification photographing mode and a normal photographing mode, which are to be detailed later.

The liquid crystal display switch 13 is provided at the rear surface of the digital camera above the liquid crystal display unit 3. The liquid crystal display switch 13 is operated to switch the liquid crystal display unit 3 between the display (ON) state and the non-display state (OFF).

An optical viewfinder 14 is provided at the rear surface of the digital camera above the liquid crystal display unit 3. The optical viewfinder 14 allows the photographer to check the composition during a photographing operation without using the liquid crystal display unit 3.

The four-way switch 15 is provided at the rear surface of the digital camera near the right grip 17 so that it can be operated with the thumb while holding the right grip 17. It is operated to select menu items.

The power switch 16 is provided at the rear surface of the digital camera at the lower portion of the right grip 17 under the four-way switch 15. The power switch 16, which may be set to one of three positions, "Power OFF," "Recording" and "Reproduction," cuts off the main power to the digital camera when it is at the Power OFF position and turns on the main power to the digital camera when it is at the Recording or Reproduction position. In addition, while a power timer operates to turn off the power after a specific length of time elapses to achieve energy saving when it is at the Recording position, if an operating member such as the four-way switch 15 is operated, the power is turned on again.

A sensor 7 is provided at the rear surface of the digital camera near the right grip 17 so that the thumb is naturally positioned over the sensor 7 while holding the right grip. As a result, as illustrated in FIG. 2, by pressing the shutter release switch 4a with the thumb placed on the sensor, information regarding the fingerprint on the thumb is detected.

(Operation of Electronic Image-capturing Apparatus, i.e., Digital Camera)

FIGS. 3~5 and 7 are flowcharts of the control processing performed by the microcomputer 1 in the digital camera, and FIG. 6 illustrates display states of the liquid crystal display unit 3 of the digital camera.

Figure 3:
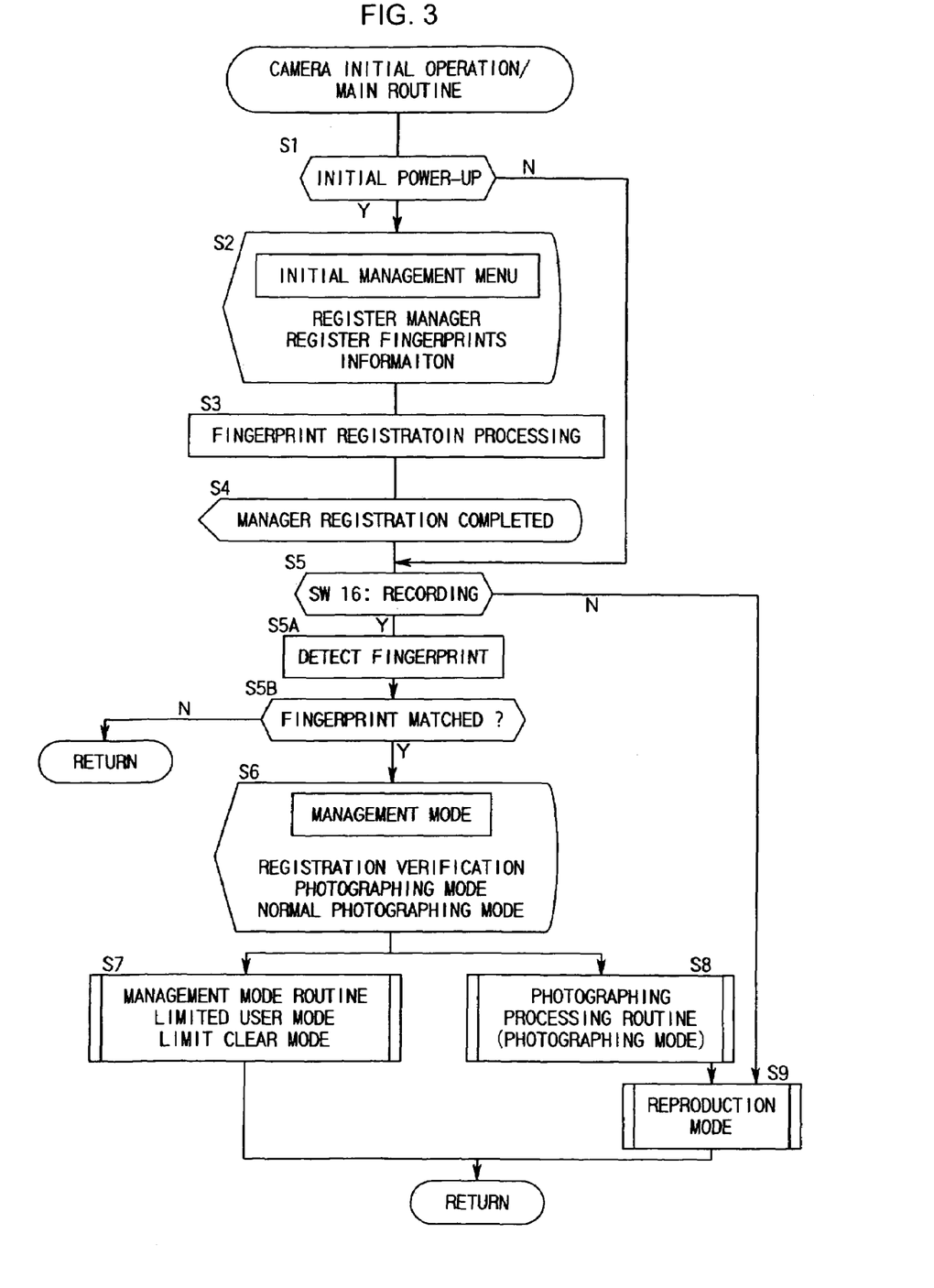
FIG. 3 is a flowchart of the initial operation and the main routine performed in the camera by the microcomputer of the digital camera.

<1> Manager Registration Processing Routine Operation (FIG. 3)

In reference to FIG. 3, the initial operation of the digital camera, i.e., the manager registration processing, is explained.

When the purchaser of the digital camera turns on the power for the first time after loading batteries (step S1), the "Initial Management Menu" with a message "Execute manager registration. Register fingerprint information." as shown in step S2 is displayed at the liquid crystal display unit 3. The initial power-up is achieved by setting the power switch 16 from the "OFF" position to the "Recording" or the "Reproduction" position.

Figure 5:
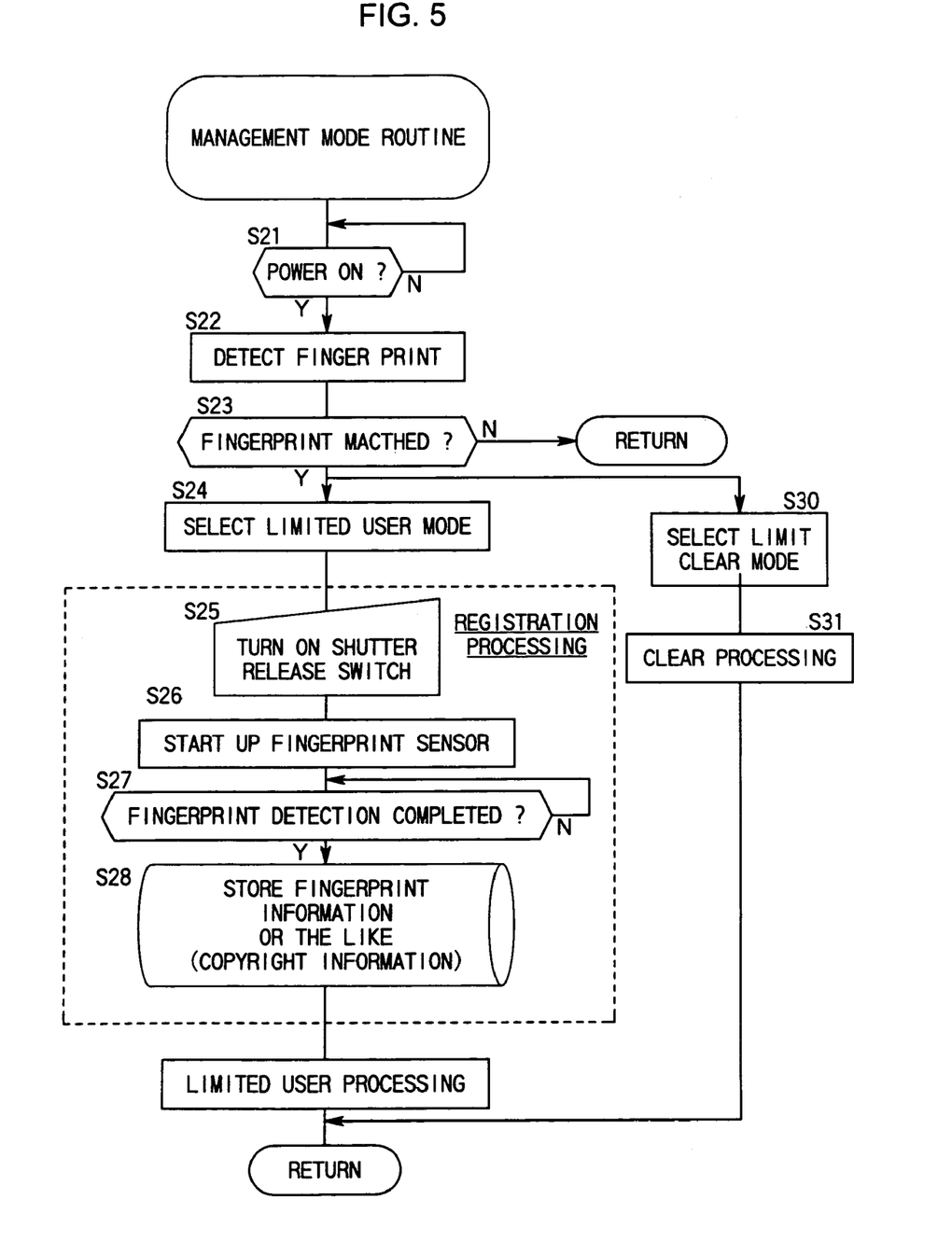
FIG. 5 is a flowchart of the routine performed in a management mode by the microcomputer in the digital camera.

In response to the instruction, fingerprint registration processing is executed in step S3. During this registration processing, the fingerprint information corresponding to the manager of the digital camera is recorded in the RAM 2, i.e., the fingerprint information is recorded as inherent information inherent to the manager (initial registrant) in the RAM 2. This registration processing, which is similar to the processing performed in steps S25~28 in FIG. 5, is to be explained in detail later.

When the fingerprint registration processing is completed in step 3, a message "Manager registration completed" as shown in step S4 is displayed at the liquid crystal display unit 3 in step S4. In addition, as shown in FIG. 6D, ID information corresponding to the registered fingerprint information (inherent information) is extracted from the ROM 5 and is displayed at the liquid crystal display unit 3. Thus, the registrant is advised of his ID number, i.e., the displayed ID information. Ultimately, this ID information undergoes digital watermarking processing together with photographic image information, is recorded in the recording medium 6 and is recorded as copyright information in the photographed image.

The processing described above is the initial operation executed after the purchase of the digital camera, and the first registrant (purchaser) is regarded as the manager of the digital camera after the initial operation. The digital camera having undergone the initial operation enables operations such as photographing processing by the registered manager, i.e. the initial registrant, alone, and it does not, in principle, allow photographing to be performed by a party other than the manager of the digital camera.

Thus, subsequently, processing in steps S1~4 is no longer executed in the digital camera having undergone the initial operation, and a control operation is performed starting in step 5.

Next, the actual operation (the control operation starting in step S5) performed in the digital camera (hereafter referred to as the camera) is explained.

In step S5, if the power switch 16 is at the Recording position, the operation proceeds to step S5A, whereas if the power switch 16 is at the "Reproduction" position, the operation proceeds to step 9 to perform an operation in a "Reproduction Mode". The reproduction mode routine is to be explained later in reference to FIG. 4.

In step S5A, the fingerprint of the thumb placed on the sensor 7 for fingerprint detection is detected before the operation proceeds to step S5B. Instep S5B, a decision is made as to whether or not the detected fingerprint matches the fingerprint information belonging to any of the registrants registered in the RAM 2. If there is a match, the operation proceeds to step S6, whereas if there is no match, the processing ends. As a result, even when the power to the camera is turned on after the initial registration is completed, the operation in a mode other than the reproduction mode is allowed to proceed to the next step only if the camera is being used by a registered user. It is to be noted that the fingerprint verification is achieved by using an algorithm of the known art.

When the menu switch 12 is turned on in step S6, the "Management Mode", the "Registration Verification Photographing Mode" and the "Normal Photographing Mode" are displayed as shown in step S6 at the liquid crystal display unit 3, and thus mode selection to be performed by using the four-way switch 15 is enabled. The camera is initially set in the "Registration Verification Photographing Mode", and the initial setting display at the liquid crystal display unit 3 indicates the "Registration Verification Photographing Mode".

If the "Management Mode" is selected using the four-way switch 15 and is set through the shutter release switch 4a in step S8, the operation proceeds to the management mode routine in step S7. Details of the management mode routine are to be explained later in reference to FIG. 5. In addition, if either the "Registration Verification Photographing Mode" or the "Normal Photographing Mode" is selected, the operation proceeds to step S8 to engage in the photographing processing routine. Details of the photographing processing routine are to be explained later in reference to FIG. 7. The processing shown in FIG. 3 is executed repeatedly.

In the "Registration Verification Photographing Mode", only a registered party is allowed to perform a photographing operation and parties other than registered parties are prohibited from photographing by making a decision as to whether not the photographer is registered in the camera. In addition, the "Management Mode" allows the camera to be set so as to allow a party other than the initial registrant to use the camera.

When the "Normal Photographing Mode" is selected by a party registered in the camera, the camera can be used by anyone until the power switch 16 is reset from the Recording position to the OFF position or the Reproduction position.

Figure 4:
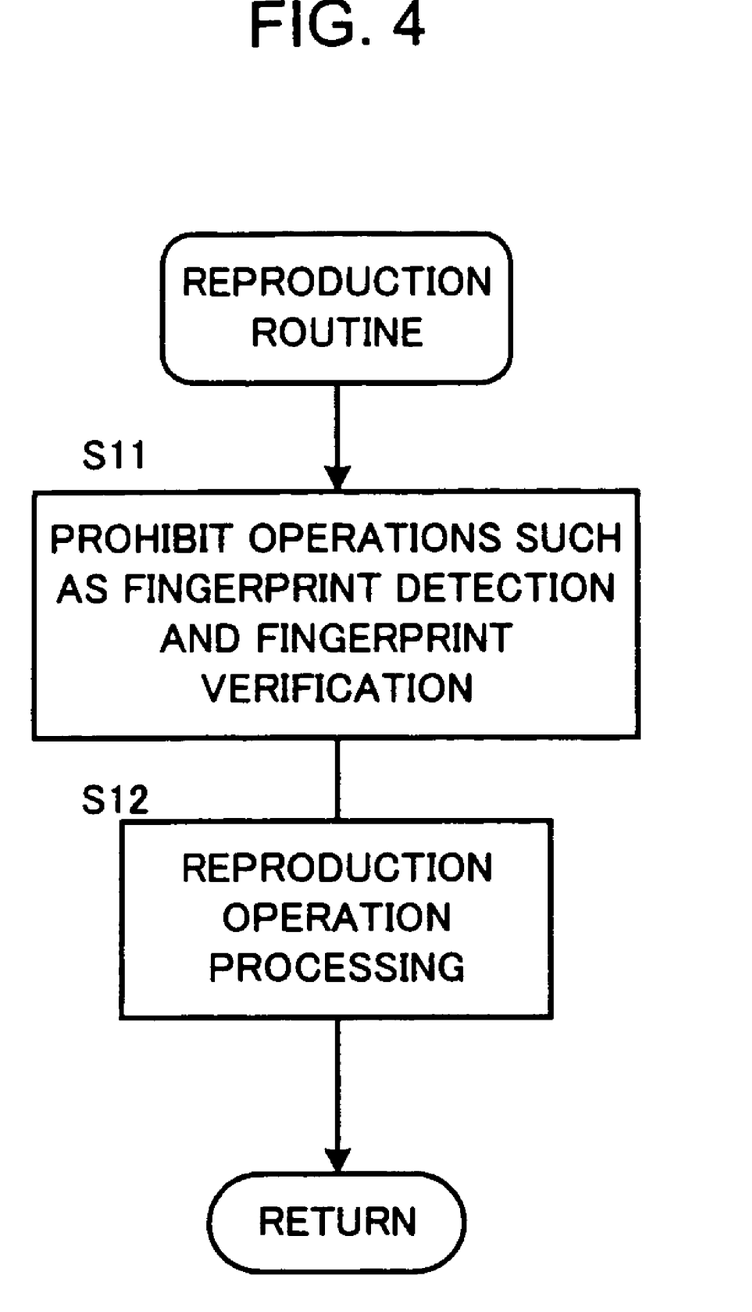
FIG. 4 is a flowchart of the reproduction operation performed by the microcomputer in the digital camera.

<2> Reproduction Mode Routine Operation (FIG. 4)

If the power switch 16 is set at the Reproduction position in step 5, the operation proceeds to step S9 to reproduce a photographic image recorded by the camera on the liquid crystal display unit 3 or on an external monitor.

Unlike in the recording mode, (a categorical term used to refer to the "Management Mode", the "Registration Verification Photographing Mode" and the "Normal Photographing Mode"), it is not necessary to restrict the use of the camera by anyone in the reproduction mode and, as a result, any person can reproduce a recorded photographic image, in principle.

In step S11, operations such as fingerprint detection, fingerprint verification and the like are prohibited, and a recorded photographic image is reproduced in step S12. The operation in step S12 is repeated as necessary.

<3> Management Mode Routine Operation (FIGS. 5 and 6)

The management mode routine is implemented to execute the fingerprint registration processing so that the manager (the initial registrant) can confer authorization to another party to use the camera or cancel the authorization of such use by another party.

In step S21, power supply is verified before the operation proceeds to step S22.

In steps S22 and S23, a decision is made as to whether or not the photographer is the party authorized to manage the camera, i.e., the initial registrant. Namely, with the shutter release switch 4a pressed with the thumb placed on the sensor 7 for fingerprint detection at the camera, the sensor 7 detects fingerprint information, and a decision is made as to whether or not the fingerprint information matches the fingerprint information of the initial registrant registered in the RAM 2. If they match, a "Limited User Mode" and the "Limit Clear Mode" are displayed at the liquid crystal display unit 3 so that either mode can be selected using the four-way switch 15. In conformance to the selection made through the four-way switch 15, the operation proceeds to either step S24 or step S30.

In the "Limited User Mode", user registration is performed in the camera so that the initial registrant can allow a party other than himself to use the camera. In addition, in the "Limit Clear Mode", the party that has been additionally registered under the limited user mode by the initial registrant is cleared.

If the "Limited User Mode" is selected using the four-way switch 15 and is set through the shutter release switch 4a in step S24, the operation proceeds to step S25.

Figure 6A:
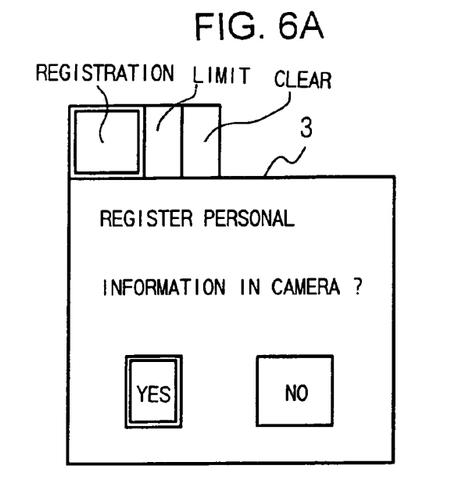
FIGS. 6A~6D illustrate display states at the liquid crystal display unit 3 of the digital camera.

In step S25, the "Registration Setting Screen" shown in FIG. 6A is brought up on the liquid crystal display unit 3, and with "Yes" selected using the four-way switch 15, the shutter release switch 4a is turned on while keeping the thumb placed on the sensor 7 as shown in FIG. 2. It is to be noted that the display in FIG. 6A is also brought up in step S3 mentioned earlier for registration of registrant fingerprint information as in step S25.

In steps S26 and S27, the sensor 7 for fingerprint detection operates to detect fingerprint information. In step S28, the detected fingerprint information is recorded in the RAM 2 and is registered as inherent information.

Figure 6B:
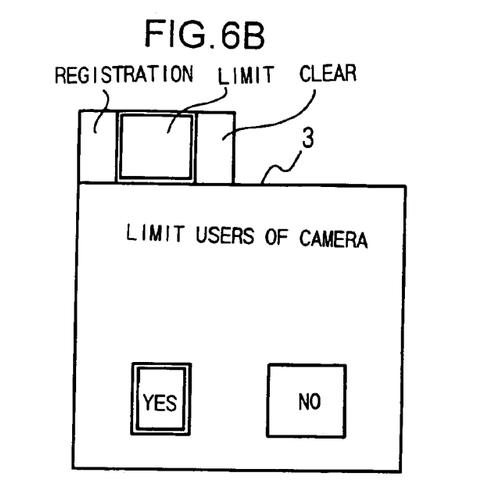

In step S29, "Limited" is selected in the display shown in FIG. 6A using the four-way switch 15 and is set through the shutter release switch 4a. As a result, the "Limited User Setting Screen" display shown in FIG. 6B is brought up on the liquid crystal display unit 3, and then, "Yes" is selected using the four-way switch 15 and is set through the shutter release switch 4a. Thus, the party registered at this time becomes also authorized to use the camera, through limited authorization. By repeating this routine, a plurality of camera users can be registered.

If the "Limit Clear Mode" is selected using the four-way switch 15 and is set through the shutter release switch 4a in step S30, the operation proceeds to step S31.

Figure 6C:
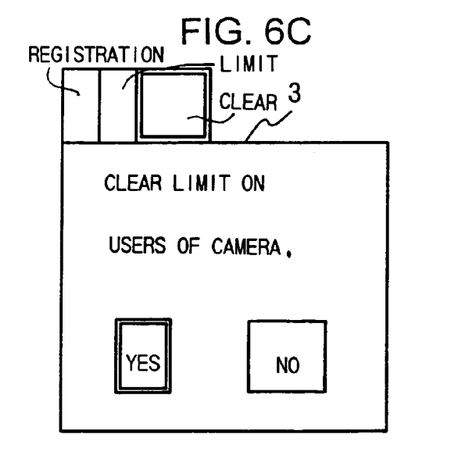
Figure 6D:
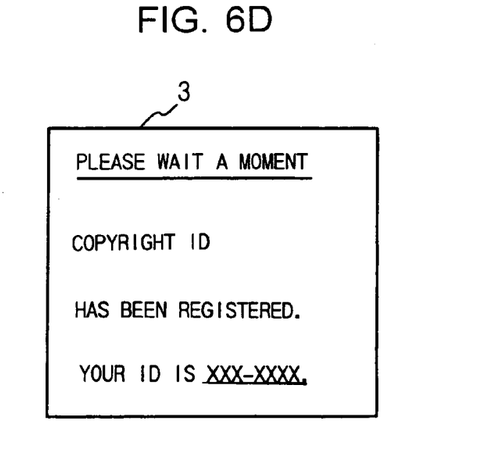

In step S31, "Clear" is selected using the four-way switch 15 in the display shown in FIG. 6B and then is set through the shutter release switch 4a. As a result, the "Limit Clear Setting Screen Display" shown in FIG. 6C is brought up on the liquid crystal display unit 3. Then "Yes" is selected using the four-way switch 15 and is set through the shutter release switch 4a. Thus, the party authorized to use the camera is deleted to clear limited authorization.

By repeating the processing described above, the manager (initial registrant) of the camera can authorize parties other than himself to use the camera.

Figure 7:
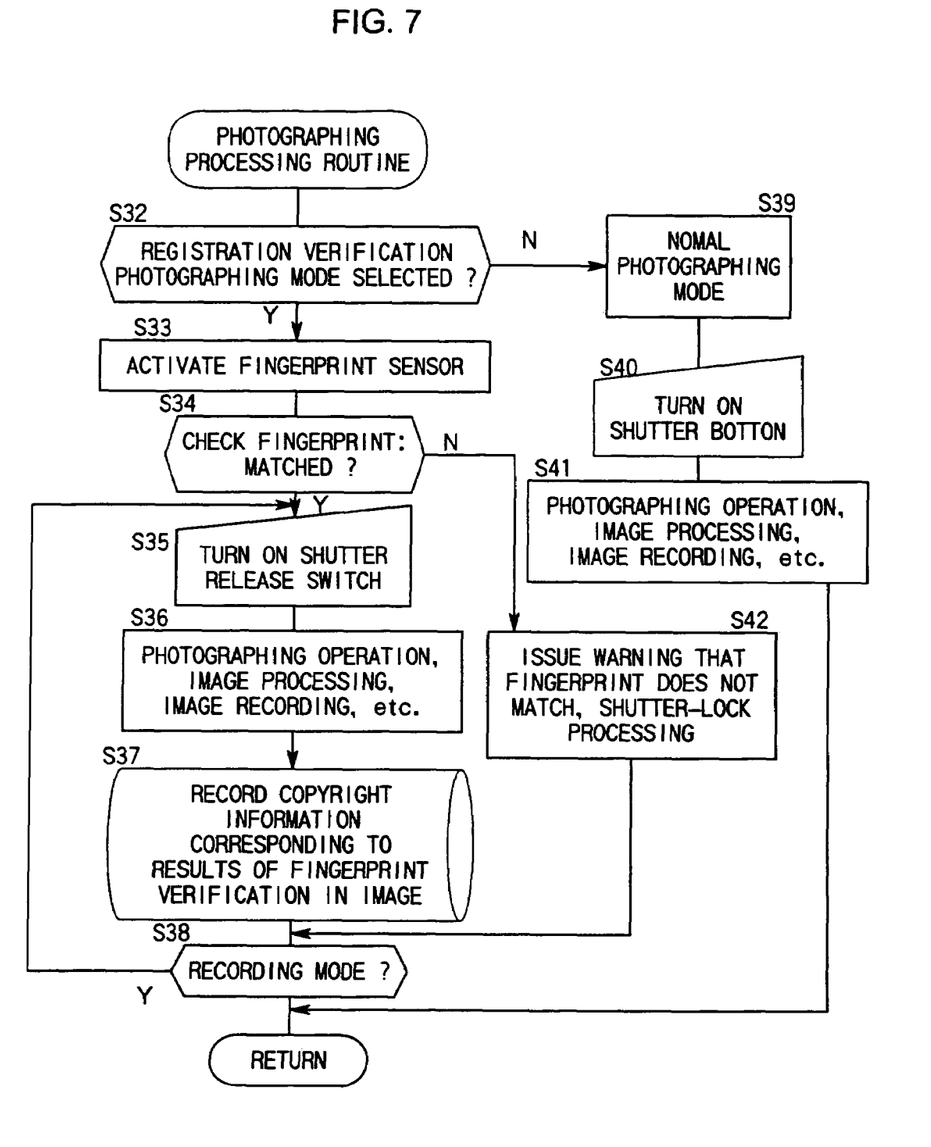
FIG. 7 is a flowchart of the photographing processing routine performed by the microcomputer in the digital camera.

<4> Photographing Processing Routine Operation (FIG. 7)

A party that has become registered as described above is now authorized to use the camera which allows only limited parties to take photographs with the camera through fingerprint verification at the camera. Now, the two photographing modes of the camera are explained.

In step S32, the decision is made as to whether not the "Registration Verification Photographing Mode" is set. If the "Registration Verification Photographing Mode" is set, the operation proceeds to step S33.

With the thumb of the user placed on the sensor 7, the sensor 7 for fingerprint detection starts to operate in step S33. Since the user holds the grip at the side of the camera in a photographing state under normal circumstances, the thumb of the user will be placed naturally on the sensor 7 to automatically activate the sensor 7 which then engages in the detection operation.

A fingerprint verification operation is performed in step 34, in which the fingerprint information detected by the sensor 7 is compared against the fingerprint information of parties already registered in the RAM 2, and if it is decided that there is a match, the operation proceeds to step S35.

By turning on the shutter release switch 4a of the camera, the photographing sequence starts in steps S35 and S36, during which image signals from the image-capturing element undergo image processing (processing such as interpolation and compression).

In step S37, the ID information corresponding to the results of the fingerprint verification is read out from the ROM 5 for the photograph image information having undergone image processing. This ID information, together with the photograph image information, undergoes the digital watermarking processing, is recorded in the recording medium 6 and is recorded in the photographed image as a copyright.

In step S38, the microcomputer CPU 1 enables a photographing operation of the camera without fingerprint verification operation in steps S33 and S34, as long as it is decided in steps S33 and S34 that the registrant fingerprint information (inherent information) has been matched and power is being supplied with the power switch 16 at the Recording position. In other words, until the power switch 16 is reset from the power on state to a power OFF state, i.e., to the "OFF" position or the Reproduction position, the microcomputer CPU 1 assures the camera photographing operation without requiring fingerprint information verification processing to be implemented.

In step S42, a warning is issued with a message that there has been no match in fingerprint verification in step S34 and the acceptance of a signal from the shutter release switch 4a is prohibited. As a result, a photographing operation of the camera by an unregistered party is not allowed, so that the assignment of copyright to the photographed image is assured.

When the camera registrant selects the normal photographing mode in step S39, the camera is set in an unlimited mode, in which no limit is imposed with regard to the use of the camera so that parties other than the registrant are able to use the camera. Thus, the camera enters a state in which it can be used by any person and the processing for digitally watermarking the ID information in photograph image information stops.

By turning on the shutter release switch 4a, the photographing sequence starts in step S40 and S41 and image signals from the image-capturing element undergo image processing (processing such as interpolation and compression) While no ID information is digitally watermarked in the image information, the camera can be used by anyone in this state.

By repeating the operations described above, the photographing processing, the image processing and the recording processing are implemented in the camera.

In addition, if the inherent information that is registered is voice print information instead of fingerprint information in the camera described above, the sensor 7 is constituted of a microphone for voice detection and voice print information detected through the microphone is registered. If the inherent information that is registered is iris print information, the sensor 7 is provided inside the optical viewfinder 14, and with the photographer looking through the viewfinder, the iris print information is registered as image data.

As explained above, since the use of the electronic image-capturing apparatus (digital camera) is allowed through user inherent information detection only when the user inherent information matches registered information and the apparatus is prevented from being used by a third party without authorization. In addition, the copyright holder can be easily and reliably identified.

Furthermore, since so-called digital watermarking whereby the registrant's inherent information is detected and an person's inherent information is automatically embedded in an image is employed, a photographed image taken with the electronic image-capturing apparatus can be easily be proved to be the copyrighted property of the photographer.

Moreover, if the registrant's inherent information is detected when the switch is at the Recording position, i.e., when the camera is in the photographing mode, subsequent use of the electronic image-capturing apparatus is enabled without requiring inherent information detection as long as the photographing mode is sustained. Thus, it is not necessary to verify inherent information for each photographing operation, thereby achieving good operability in, for instance, continuous shooting.

In addition, since a plurality of sets of registrant's inherent information can be registered and the electronic image-capturing apparatus only allows use by registered parties, advantages are achieved in that a single electronic image-capturing apparatus can be jointly owned by a plurality of limited registrants and in that other registrants can be added or modified only by the limited registrant.

Furthermore, since the limited user mode and the unlimited mode (the electronic image-capturing apparatus can be used by anyone) can be selected only by a registrant, an optimal mode can be selected from among the modes described above in correspondence to the state of use of the electronic image-capturing apparatus.

Also, since the sensor 7 for detecting the inherent information is provided near the grip, the object of detection (fingerprint, voice print, iris print or the like) can be detected in a natural manner when the apparatus is being used by the registrant.

In addition, since the person whose inherent information is initially registered is assigned to be the camera manager and updating of the inherent information can be performed only by the registrant, i.e., the inherent information can be changed or inherent information can be added or deleted only by the registrant, any unauthorized photographing operation by a party without managing authority with the electronic image-capturing apparatus is prevented so that copyright with respect to the image information obtained through a photographing operation performed on the electronic image-capturing apparatus is protected.

Moreover, with the processing for detecting registrant's inherent information and the like disabled when the reproduction mode is selected, a third party other than the registrant can freely view photographed images already recorded in the recording medium, since the issue of copyright registration does not arise in reproduction unlike in recording, and rather, it is more convenient to ensure that recorded images can be viewed freely by anyone.

What is claimed is:

1. An electronic image-capturing apparatus, comprising:
    an image-capturing element that captures an image of a subject and generates electronic image information;
    a recording device that records the electronic image information that has been generated in a recording medium;
    a registration device that registers inherent information with respect to a registrant;
    an information detection device that detects inherent information with respect to a user of the electronic image-capturing apparatus;
    an information verification device that references the inherent information with respect to the user detected by the information detection device with the inherent information registered in the registration device;
    a control device that allows an image-capturing operation to be performed on the electronic image-capturing apparatus if it is decided by the information verification device that the two sets of inherent information match; and
    a digital watermarking device that adds identification information corresponding to the inherent information detected by said information detection device to the electronic image information, the identification information enabling third parties to readily identify the user when viewing an image reproduced based on the electronic image information, wherein the identification information is a digital watermark.

2. An electronic image-capturing apparatus according to claim 1, further comprising:
    a power control device having a switch to be set at a recording position, a reproduction position or an OFF position, that controls power ON/OFF, wherein:
    said control device allows an image-capturing operation to be performed on the electronic image-capturing apparatus without requiring said information verification device to operate when said switch remains at said recording position after said information verification device decides that the two sets of inherent information match when said switch is at said recording position.

3. An electronic image-capturing apparatus according to claim 1, wherein:
the inherent information is a registrant's fingerprint information; and
said information detection device includes a sensor that detects fingerprint information.

4. An electronic image-capturing apparatus according to claim 3, further comprising:
a grip used by the user to hold the electronic image-capturing apparatus while capturing an image of a subject, wherein
said sensor is provided at a position at which a finger of the user is naturally placed when the user holds said grip.

5. An electronic image-capturing apparatus according to claim 1, further comprising:
a registration control device that prohibits updating of contents of information registered in said registration device if it is decided that there is inherent information registered in said registration device when said information verification device does not decide that two sets of inherent information match.

6. An electronic image-capturing apparatus, comprising:
an image-capturing element that captures an image of a subject and generates electronic image information;
a recording device that records the electronic image information that has been generated in a recording medium;
a registration device that registers inherent information with respect to a registrant;
an information detection device that detects inherent information with respect to a user of the electronic image-capturing apparatus;
an information verification device that references the inherent information with respect to the user detected by the information detection device with the inherent information registered in said registration device;
a control device that allows an image-capturing operation to be performed on the electronic image-capturing apparatus if it is decided by said information verification device that the two sets of inherent information match; and
wherein said control device allows a reproduction operation regardless of results of verification performed by said information verification device when the electronic image information recorded in said recording medium is reproduced, the reproduced electronic image information containing a digital watermark generated based on the inherent information, the digital watermark enabling third parties to readily identify the user when viewing the reproduced electronic image information.

7. An electronic image-capturing apparatus according to claim 1, further comprising:
a storage that stores the identification information;
wherein the digital watermarking device extracts the identification information from the storage based on the inherent information detected by the information detection device.

8. A digital camera including the electronic image-capturing apparatus of claim 1.

9. A digital camera including the electronic image-capturing apparatus of claim 6.

* * * * *